United States Patent
Briand

(10) Patent No.: US 10,310,920 B2
(45) Date of Patent: Jun. 4, 2019

(54) MANAGEMENT METHOD TO MANAGE DATA RELATIVE TO AN AIRCRAFT MISSION AND CORRESPONDING DATA MANAGEMENT MODULE

(71) Applicant: DASSAULT AVIATION, Paris (FR)

(72) Inventor: Benjamin Briand, Rueil Malmaison (FR)

(73) Assignee: DASSAULT AVIATION, Paris (FR)

( * ) Notice: Subject to any disclaimer, the term of this patent is extended or adjusted under 35 U.S.C. 154(b) by 530 days.

(21) Appl. No.: 15/058,895

(22) Filed: Mar. 2, 2016

(65) Prior Publication Data

US 2016/0259673 A1    Sep. 8, 2016

(30) Foreign Application Priority Data

Mar. 3, 2015    (FR) ...................................... 15 00401

(51) Int. Cl.
| | |
|---|---|
| *G06F 9/54* | (2006.01) |
| *G08G 5/00* | (2006.01) |
| *G06F 16/22* | (2019.01) |
| *G06F 16/23* | (2019.01) |

(52) U.S. Cl.
CPC .............. *G06F 9/546* (2013.01); *G06F 16/22* (2019.01); *G06F 16/2365* (2019.01); *G08G 5/0034* (2013.01)

(58) Field of Classification Search
None
See application file for complete search history.

(56) References Cited

U.S. PATENT DOCUMENTS

| | | | | |
|---|---|---|---|---|
| 8,069,443 | B2 * | 11/2011 | Ackerman | ............ G06F 9/5027 718/1 |
| 8,352,516 | B2 * | 1/2013 | Walter | .................. G06F 16/252 707/809 |
| 8,892,273 | B1 | 11/2014 | Raghu et al. | |
| 9,047,234 | B1 * | 6/2015 | Nara | ........................ G06F 16/00 |
| 9,731,815 | B2 * | 8/2017 | Pangilinan | ............ G08G 5/0021 |

(Continued)

FOREIGN PATENT DOCUMENTS

| | | |
|---|---|---|
| EP | 2608187 A1 | 6/2013 |
| FR | 2954531 A1 | 6/2011 |

OTHER PUBLICATIONS

French Search Report of priority application.

*Primary Examiner* — Richard L Bowen
(74) *Attorney, Agent, or Firm* — Davidson, Davidson & Kappel, LLC

(57) ABSTRACT

A management method is provided for managing data relative to an aircraft mission comprising at least one flight by an aircraft, the data comprising input data of at least two applications and output data of the applications, each application being able to be executed by a computer to determine, from the input data of the application, the output data. The method includes a step for providing a set of generic data, each of the generic data being an input datum shared by at least two of the applications, a step for assigning a value to at least one of the generic data for at least one flight of the mission, and a step for configuring the applications comprising the automatic assignment, to each input datum corresponding to a generic datum, of the value of the generic datum.

18 Claims, 3 Drawing Sheets

(56) References Cited

U.S. PATENT DOCUMENTS

| | | | |
|---|---|---|---|
| 2010/0145553 A1* | 6/2010 | Vial | G01C 23/00 |
| | | | 701/3 |
| 2010/0223566 A1* | 9/2010 | Holmes | G06F 3/0481 |
| | | | 715/764 |
| 2011/0153212 A1 | 6/2011 | Debrito et al. | |
| 2012/0265372 A1* | 10/2012 | Hedrick | H04L 67/36 |
| | | | 701/3 |
| 2013/0124068 A1* | 5/2013 | Kothandaraman | F02D 41/18 |
| | | | 701/104 |
| 2014/0324937 A1* | 10/2014 | Abdallah | G06F 9/3017 |
| | | | 708/706 |
| 2015/0148998 A1* | 5/2015 | Mere | G05D 1/00 |
| | | | 701/3 |
| 2015/0149937 A1* | 5/2015 | Khalid | G06F 9/451 |
| | | | 715/762 |
| 2015/0150095 A1* | 5/2015 | Mere | G05D 1/00 |
| | | | 726/4 |

* cited by examiner

MANAGEMENT METHOD TO MANAGE DATA RELATIVE TO AN AIRCRAFT MISSION AND CORRESPONDING DATA MANAGEMENT MODULE

This claims the benefit of French Patent Application FR 15 00401, filed Mar. 3, 2015 and hereby incorporated by reference herein.

The present invention relates to a management method for managing data relative to a mission comprising at least one flight by an aircraft, said data comprising input data of at least two applications and output data of said applications, each application being able to be executed by a computer to determine, from the input data of said application, the output data of said application.

Such a method is for example intended to be implemented during the preparation of a mission intended to be carried out by one or more aircraft, during the execution of a flight of that mission, and/or at the end of that flight.

For mission preparation, during the execution of these missions, and at the end of one or more flights of the mission, several applications are made available to an operator, for example the pilot, to determine and provide the operator with information related to the mission, for example performance parameters of the aircraft.

BACKGROUND

These applications are for example executed on a computer of the aircraft. Each application is able to determine output data by executing a function specific to the application, from input data previously entered, so that said output data may be displayed for the operator or used by target systems. The input data for example relate to the mission or a given flight of that mission, and the aircraft having to perform that mission. The output data for example assume the form of digitized data, images, text files, tables, etc.

The values of the input data are for example entered by the operator during preparation for the mission freely or through the use of automatons or applications and can be modified if needed.

The input data of the different applications partially overlap, some input data being shared by several applications. Nevertheless, the applications are independent of one another, such that a same value of an input datum shared by several applications must be entered manually in each of these applications. Entering and updating the input data of the applications is tedious. Furthermore, due to the lack of link between the various applications, no mechanism is provided to verify that the input data shared by several applications indeed have a unique value for all of these applications, or to verify that a change in value of an input datum has indeed been taken into account by all of the applications using the input datum.

SUMMARY OF THE INVENTION

An object of the invention is therefore to provide a method and a system making it possible to enter the input data of applications more easily, and to ensure consistency between the values of the input data relative to one another and relative to the output data.

To that end, the invention provides a method of the aforementioned type, characterized in that the method comprises:

a step for providing at least one set of generic data, each of said generic data being an input datum shared by at least two of said applications, a step for assigning a value to at least one of said generic data for at least one flight of said mission, a step for configuring said applications comprising the automatic assignment, to each input datum corresponding to a generic datum, of the value of said generic datum.

According to specific embodiments, the method includes one or more of the following features:

the method further comprises, after the configuration step, a step for executing at least one application, based on values of the input data assigned during the configuration step, to determine the value of the output datum or data of said application;

the method further comprises, after the execution step, a step for assigning the value of at least one output datum determined during said execution step to one or more generic data corresponding to said output datum;

the method further comprises at least one step for verifying consistency, comprising:
a verification of the consistency of the value of at least one generic datum with the value of at least one corresponding input datum, and/or
a verification of the consistency of the value of at least one generic datum with the value of at least one corresponding output datum, and/or
a verification of the consistency of the value of at least one output datum of a first application with the value of the corresponding input datum of one or more other applications, the value of a first datum being deemed consistent with the value of a second datum if the value of the first datum and the value of the second datum meet a predetermined criterion;

the value of a first datum is deemed consistent with the value of a second datum if the absolute value of a deviation between the value of the first datum and the value of the second datum is null or below a predetermined threshold;

the verification step comprises, when the value of at least one input datum is deemed inconsistent with the value of the corresponding generic datum or with a corresponding output datum of another application, an update of the value of the input datum, in which the value of said generic datum or said output datum is assigned to said input datum;

the method comprises a step for generating, for at least one flight of said mission, a flight dossier comprising, for each application having been executed, the values of the input data and the value of each output datum of said application, as determined by executing said application based on said values of the input data of said application;

the method comprises a step for generating, for all of said mission, a mission dossier comprising said or each of said flight dossier(s).

The invention also provides a method for managing a mission comprising at least one flight of an aircraft, said method comprising:

implementing a management method for managing data relative to said mission on a module outside said aircraft, before performing a given flight of said mission, a phase for loading the mission dossier and the flight dossier relative to said given flight from said module in an onboard memory in said aircraft, before the performance of said given flight by the aircraft, a phase for unloading the mission dossier and the flight dossier relative to said given flight from an onboard memory in said aircraft intended for at least one module outside the aircraft, after the performance of said given flight by the aircraft.

According to specific embodiments, the method includes one or more of the following features:

said loading phase comprises the transfer of said mission dossier and said flight dossier from said outside module into a module onboard said aircraft, before the performance of said given flight by the aircraft, and advantageously comprises a verification of the consistency of the value of at least one input or output datum from said outside module with the value of at least one corresponding input or output datum in said onboard module, from the aircraft, and said unloading phase comprises a transfer of the mission dossier and the flight dossier relative to said given flight from said onboard module to said outside module, after the performance of said given flight by the aircraft;

the method comprises, at the end of at least one flight of the mission, a phase for unloading the flight dossier from the onboard memory in said aircraft to the outside module.

The invention also provides a management module for managing data relative to a mission comprising at least one flight by an aircraft, said data comprising input data of at least two applications and output data of said applications, each application being able to be executed by a computer to determine, from the input data of said application, the output data of said application.

said data management module comprising a data management application configured to:

generate at least one generic data set relative to at least one flight of said mission, each of said generic data being an input datum shared by at least two of said applications, assign, to at least one generic datum, a value of said generic datum for at least one flight of said mission, configure said applications by automatically assigning, to each input datum corresponding to a generic datum, the value of said generic datum.

According to specific embodiments, the module includes one or more of the following features:

said management application for managing data is configured to verify a consistency of the values of the generic data with the values of the corresponding input data, the value of a generic datum being deemed consistent with the value of a corresponding input datum if the value of the input datum and the value of the generic datum meet a predetermined criterion;

said data management application is configured to update the value of an input datum deemed inconsistent with the value of the corresponding generic datum, by assigning the value of said generic datum to said input datum;

said data management application is configured to generate, for each flight of said mission, a flight dossier relative to said flight, said flight dossier comprising, for each application having been executed, the values of the input data and the value of each output datum of said application, as determined by executing said application based on said values of the input data of said application;

the data management application is configured to verify the consistency of the value of at least one generic datum with the value of at least one corresponding output datum, the value of a generic datum being deemed consistent with the value of the corresponding output datum if the value of the generic datum and the value of the output datum meet a predetermined criterion;

the value of a generic datum is deemed consistent with the value of the corresponding input or output datum if the absolute value of a deviation between the value of the generic datum and the value of the input or output datum is null or below a predetermined threshold;

the data management application is configured to verify the consistency of the value of at least one output datum of a first application with the value of the corresponding input datum of one or more other applications, the value of an output datum being deemed consistent with the value of the corresponding input datum if the value of the output datum and the value of the input datum meet a predetermined criterion;

the value of an output datum is deemed consistent with the value of a corresponding input datum if the absolute value of the deviation between the value of the output datum and the value of the input datum is null or below a predetermined threshold;

the module is movable independently of any aircraft intended to perform a flight of said mission;

the module is configured to communicate with a central computer of the aircraft, using a wired or wireless link.

The invention also provides a management system for managing a mission comprising at least one flight by an aircraft, characterized in that it comprises a first data management module, movable independently of any aircraft intended to perform a flight of said mission, and at least one second data management module, onboard an aircraft designed to perform a flight of said mission.

BRIEF SUMMARY OF THE DRAWINGS

The features and advantages of the invention will appear upon reading the following description, provided solely as a non-limiting example, and done in reference to the following appended figures.

DETAILED DESCRIPTION

Figure 1:
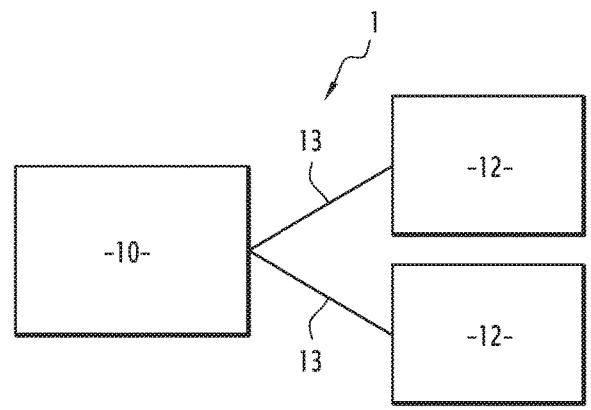
FIG. 1 is a diagrammatic illustration of a system according to one embodiment of the invention.

FIG. 1 shows a data management system 1 according to one embodiment of the invention.

The system 1 is configured to manage data relative to a mission intended to be carried out by one or more aircraft, so as to allow the preparation, monitoring and retrieval of this mission by an operator, in particular a pilot, a maintenance operator, or any other participant in the mission.

The system 1 comprises at least one first module 10, able to be used at a distance from any aircraft or inside an aircraft, for example a portable terminal.

The system 1 further comprises at least one second module 12 in each aircraft 2 intended to perform one of the flights of the mission. Each second module 12 is for example an onboard terminal (retractable or not), i.e., integrated into an aircraft 2. Two modules 12 are shown in FIG. 1.

The first and second modules will henceforth respectively be called portable terminal 10 and onboard terminal 12.

The portable terminal 10 and each of the other terminals 12 comprise preparation, follow-up and retrieval means for a mission or a flight of the mission.

Furthermore, the portable terminal 10 is able to be connected to each of the onboard networks 12 using the data link 13, so as to be able to exchange data with each onboard terminal 12. The data link 13 can be a wired or wireless link.

Figure 2:
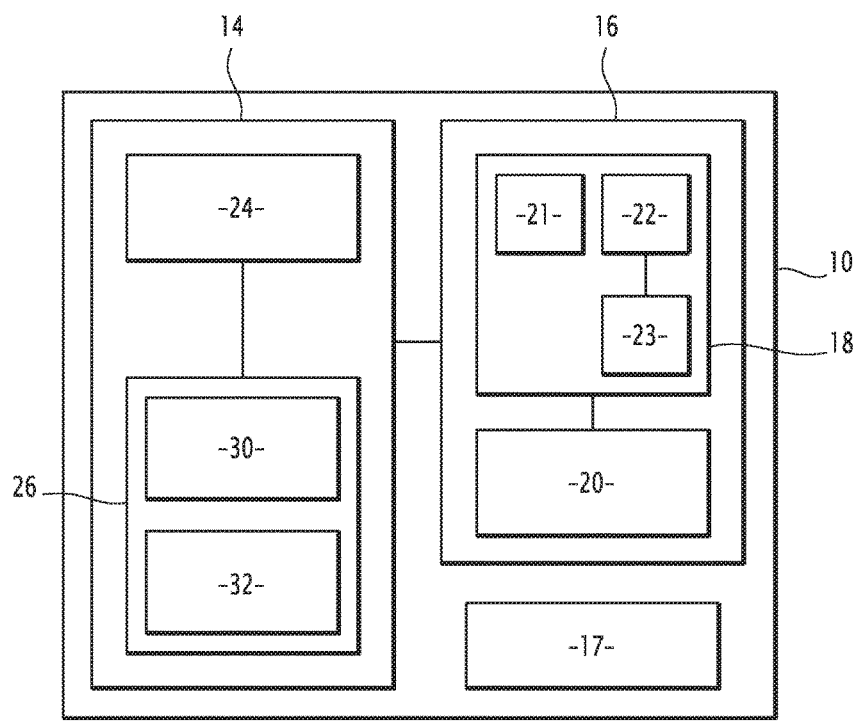
FIG. 2 is a diagrammatic illustration of a module of the system of FIG. 1.

The terminals 10 and 12 are for example similar. "Similar" means that the terminals have an identical structure and operation. FIG. 2 thus diagrammatically shows the portable terminal 10, the onboard terminal 12 being similar and comprising the same elements as those shown in FIG. 2.

According to one embodiment of the invention, the terminals 10 and 12 can be combined in a single terminal, in particular a retractable terminal.

In reference to FIG. 2, the portable terminal 10 comprises a computer 14, man-machine interface means 16, and telecommunications means 17.

The man-machine interface means 16 comprise means 18 for displaying information and means 20 for information entry by an operator. The display means 18 comprise a display device, for example a monitor 21, and means for processing graphic information, for example a processor 22 and an associated memory 23. The monitor 21 is for example a touchscreen. Thus, the entry means 20 comprise means for detecting the position of one or more control members on the monitor 21. In a known manner, these control members can be activated via a contact, for example via a stylus, the fingers of an operator, or without contact, through any other means of detecting a human interaction.

The telecommunications means 17 of the portable terminal 10 comprise a network interface allowing the portable terminal 10 to communicate with the onboard terminal 12 and with other computer devices, in particular a central computer of the aircraft, using a wired or wireless link.

The computer 14 comprises a processor 24, and one or more memories 26.

The processor 24 is suitable for executing applications contained in the memory 26, in particular an operating system allowing the traditional operation of a computer system.

The memory 26 comprises different memory zones containing applications intended to be executed by the processor 24, and data sets.

In particular, the memory 26 comprises applications 30 intended for the determination of information, for example relative to a mission of the aircraft. Each application 30 is able to determine output data, which for example relate to the mission, by executing a function specific to that application, and from input data previously entered.

Each application 30 is able to be initialized by an operator, for example by actuating an icon associated with that application 30 displayed on the screen 21, and to be executed in response to a command from the operator, for example actuation by the operator of a dedicated button displayed on the screen 21.

These output data are for example data intended for the crew of the aircraft, passengers of the aircraft, a central computer of the aircraft, and/or to be used as input data of another application. This for example involves information allowing the crew to prepare a mission plan for the aircraft, monitor it, optimize it, re-plan it or anticipate the consequences or hazards during performance of the mission, monitor its proper progression, or perform maintenance operations at the end of a flight or the mission. The output data for example assume the form of digital data, images, tables and/or text files.

As an example, the applications 30 can comprise applications intended to determine the centering and flight envelope of an aircraft designed to perform at a flight of the mission, in particular based on input data such as definition information of the aircraft, the number and distribution of passengers, etc. The applications 30 can also comprise applications able to estimate information relative to the high-speed and low-speed performance of the aircraft, applications able to provide and display, for an operator, documentation relative to an aircraft designed to perform a flight, and applications able to provide and display, for an operator participating in the mission, geographical information, for example terrain maps, flight plans, weather information, logistical information, maintenance information, information relative to the comfort or entertainment of passengers or any other information useful for the mission.

The memory 26 further comprises an application 32 for managing data relative to the mission, these data comprising input data and output data of the applications 30. The application 32 for managing data is able to be used before a flight or mission, during a flight, and/or at the end of the mission or flight.

The data management application 32 is able to determine, among the input data of the applications 30, the input data shared by at least two of these applications, and to generate, from these shared data, subsequently called generic data, at least one generic data set.

In particular, the application 32 identifies several types of generic data:
generic mission data,
generic flight data,
generic aircraft data,
any other type of generic data not related to a flight or mission, for example a group of generic data specific to certain application families.

Thus, the data management application 32 is able to generate, for the entire mission, a generic mission data set relative to the mission, and for each flight of the mission, a generic aircraft data set relative to characteristics specific to the aircraft intended to perform this flight, and a generic flight data set relative to this flight.

The data management application 32 is able to determine, among the applications output data 30, the data that make up the generic data, in particular mission or flight data or any other type of generic data.

Figure 3:
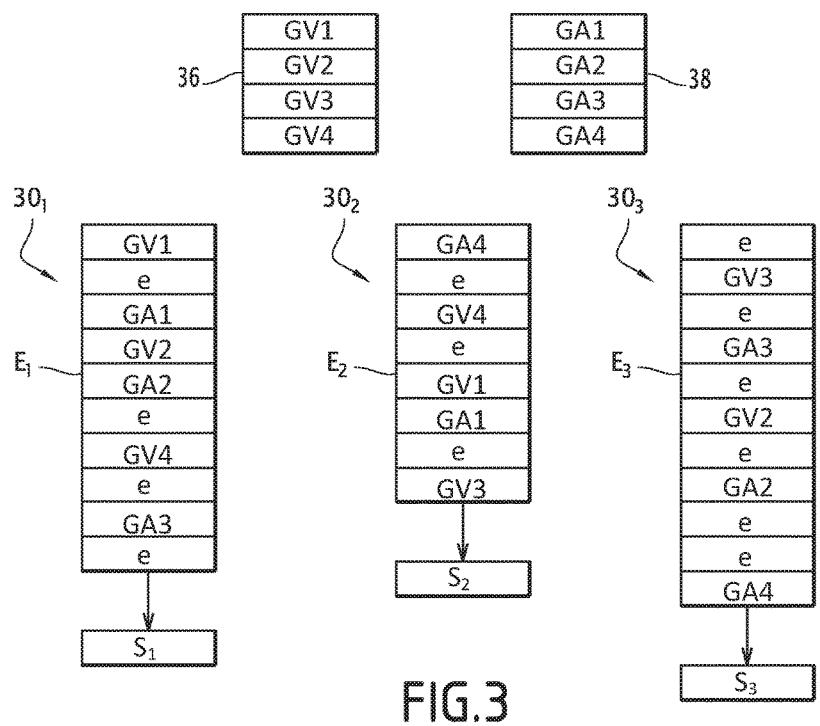
FIG. 3 diagrammatically illustrates data sets managed by the system of FIG. 1.

FIG. 3 thus diagrammatically shows, as an example, three applications 30 denoted $30_1$, $30_2$ and $30_3$, the input data $E_1$, $E_2$, $E_3$ and output data $S_1$, $S_2$ and $S_3$ associated with each of these applications, as well as the generic data sets limited to two for the example: a generic flight data set 36 and a generic aircraft data set 38 generated by the data management application 32 for these applications.

The generic flight data set 36 comprises input data $GV_1$ and $GV_4$ shared by the applications $30_1$ and $30_2$, an input datum $GV_2$ shared by the applications $30_1$ and $30_3$, and an input data and $GV_3$ shared by the applications $30_2$ and $30_3$.

Furthermore, the generic aircraft data set 38 comprises an input datum $GA_1$ shared by the applications $30_1$ and $30_2$, input data $GA_2$ and $GA_3$ shared by the applications $30_1$ and $30_3$, and an input datum $GA_4$ shared by the applications $30_2$ and $30_3$. Each application $30_1$, $30_2$ and $30_3$ further comprises other data, denoted e, specific to this application.

Each generic flight data set comprises, in the described example, characteristics of this flight, such as the date of the flight, the departure and arrival airport codes, the names of the crew members, the number of passengers and/or the serial number of the aircraft intended to perform the flight.

Each generic aircraft data set comprises, in the described example, characteristics of the aircraft (for example identified by its serial number) intended to perform at least one of the flights of the mission, such as the mass of the empty aircraft, the floor plan of the aircraft, the options present, etc.

The generic mission data are data applicable to the set of flights of the mission.

The generic mission data thus comprise data relative to the entire mission, for example the codes of the airports through which the aircraft will pass during the performance of the mission and the dates of each of the flights of the mission.

The generic mission data further comprise, if applicable, generic flight or aircraft data valid for the entire mission, such as the names of crew members, the number of passengers, and/or the serial number of the aircraft intended to perform the entire mission. Thus, when generic flight and/or aircraft data are valid for the entire mission, the generic mission data comprise data corresponding to generic flight and/or aircraft data. For example, if the onboard captain is the same on all three flights of a mission, the "captain name" is a generic mission datum. Otherwise, i.e., if at least two flights of the mission did not have the same onboard captain, the name of the onboard captain for each flight of the mission is, for each flight, a generic flight datum.

The data management application 32 is further able to assign a value to each of the generic data.

In particular, the data management application 32 is able to receive a value of each of the generic mission data, and to assign the received value to each of these generic mission data. These values are for example entered by an operator using the entry means 20 or by an application whereof the output(s) correspond to one or more generic input data.

Furthermore, the data management application 32 is able to assign, to each generic flight or aircraft datum corresponding to a generic mission datum, the value of the corresponding generic mission datum. For example, if the generic mission data comprise the name of the onboard captain intended to perform the entire mission, the data management application 32 is able to assign this name to the corresponding generic flight datum of each of the generic flight data sets.

The data management application 32 is also able to receive, for each of the flights, the values of the generic flight and/or aircraft data not yet received, and to assign each of these generic flight and/or aircraft data the received value. These values are for example entered by an operator using the entry means 20.

During the installation of an application 30 by an operator, the data management application 32 is able to assign, to each of the input data of the application 30 corresponding to a generic datum, the value of that generic datum.

The data management application 32 is thus able to automatically enter the values of the input data shared by at least two applications 30 during the initialization of each of these applications 30, from values assigned to the corresponding generic data.

The applications 30 can be executed freely, in relation with the entire mission, or in relation with a specific flight of a mission.

When an application 30 is executed freely, the operator uses the application traditionally by determining his own inputs and outputs.

When the applications 30 are executed in relation with the entire mission, they are initialized from generic mission data and all or part of the generic flight data depending on the needs of the application.

On the contrary, when the applications 30 are executed in relation with a specific flight of a mission, the input and output data values of the applications are specific to that flight.

Thus, during the initialization of an application 30 related to the entire mission, the data management application 32 is able to assign, to each of the input data of the application 30 corresponding to a generic mission datum of the assembly 34, the value of this generic mission datum.

During the initialization of an application 30 related to specific flight, the data management application 32 is able to assign, to each of the input data of the application corresponding to a generic flight or aircraft datum, the value of that generic flight or aircraft datum in the generic aircraft 36 or flight 38 data set associated with that specific flight.

Furthermore, the data management application 32 is able to generate, for each flight of the mission, a data dossier relative to that flight, hereinafter called flight dossier, and to save that flight dossier in an associated mission dossier in the memory 26.

Each flight dossier comprises, for each application 30 having been executed, the values of the input data based on which the application 30 has been executed, and the corresponding output data, i.e., as determined by executing the application 30 based on these input data values. Each flight dossier thus comprises, for each application 30 having been executed and the result of which has been saved, a pair of input data and corresponding output data.

The data management application 32 is also able to generate, for the entire mission, a data dossier relative to the entire mission, i.e., to all of the flights, hereinafter called mission dossier, and to save this mission dossier in the memory 26.

The mission dossier comprises all of the flight dossiers relative to the flights of the mission.

The data management application 32 is further able to command the display, on the monitor 21, of a window graphically illustrating the content of a flight or mission dossier.

Figure 4:
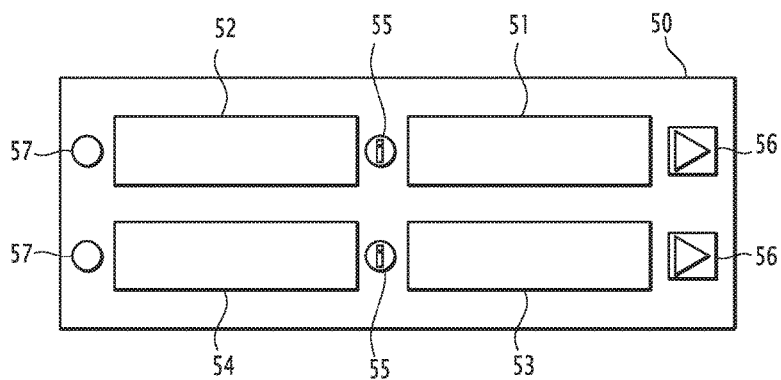
FIG. 4 diagrammatically illustrates a view of a display device of the system of FIG. 1.

FIG. 4 shows, as an example, a window 50 able to be displayed on the monitor 21 by the data management application 32. The window 50 graphically illustrates the content of a flight dossier DV comprising two recordings of the outputs of two applications $30_1$ and $30_2$. The outputs S of these applications are respectively represented by the inserts 52 and 54 providing access either directly, or by acting on said inserts 52 and 54, to the results of the applications $30_1$ and $30_2$, respectively.

The window 50 further comprises, for each application $30_1$, $30_2$, a first icon 55 forming a button that can be actuated by an operator, and intended to generate the display, when it is actuated, of the values of the input data $E_1$, $E_2$ of the corresponding application $30_1$, $30_2$, characterized by the inserts 51 and 53, respectively.

The window 50 also comprises, for each application $30_1$, $30_2$, a second icon 56 forming a button that can be actuated by an operator, and designed to cause, when it is actuated, opening of the corresponding application $30_1$ or $30_2$ with a predetermined set of input data. If no conflict is detected between the modes specified below, the input data taken into account are for example by default those accessible through the icon 55.

The window 50 further comprises, for each application $30_1$, $30_2$, a third icon 57, forming a consistency indicator, as described below.

The data management application 32 is in fact able to verify at any time, i.e., before, during or after the mission, the consistency between the current values of the generic data and the values of the data stored in the mission dossier and the flight dossiers. Such a verification is intended to take into account any modifications in the value of certain generic data that would have been done after saving the values of the input data and output data from the different applications in the mission dossier or a flight dossier.

To that end, the data management application 32 is able to detect a modification of the value of a generic datum (for example, a generic mission or flight datum) and to compare the value of the generic datum as modified with the values of the corresponding input data stored in the mission dossier or a flight dossier.

The data management application 32 is further able to judge whether the value of a generic datum is consistent with the value of a corresponding input datum, if the value of the generic datum and the value meet a predetermined criterion, or on the contrary to judge that the value of the generic datum is inconsistent with the value of the corresponding input datum, if the value of the generic datum and the value of the input datum do not meet the predetermined criterion.

The criterion used to judge the consistency between a generic datum and the corresponding input datum for example depends on the type of the generic datum, and can be set individually for each generic datum.

If the generic datum is numerical, the criterion is for example an equality between the value of the generic datum and that of the corresponding input datum. The value of the generic datum is then judged to be consistent with the value of the corresponding input datum if the value of the input datum is equal to the value of the generic datum, or otherwise inconsistent.

Also, if the generic datum is numerical, the criterion is for example a predetermined threshold between the value of the generic datum and that of the corresponding input datum, for example expressed in percentage. The value of the generic datum is then judged to be consistent or inconsistent with the value of the corresponding input datum if the deviation between the value of the input datum and the value of the generic datum is below, above, respectively, this predetermined threshold.

The predetermined threshold is for example less than 20%, or even less than 10%.

The criterion can also be an order relationship between the value of the generic datum and the value of the corresponding input datum. The value of the generic datum is then judged to be consistent with the value of the corresponding input datum if the value of the input datum is above (or below, depending on the criterion) the value of the generic datum.

When the value of at least one input datum is judged to be inconsistent with the value of the corresponding generic datum, the data management application 32 is able to signal this inconsistency to an operator, to allow an update of the value of the input datum, and of the output data or data determined based on this input datum.

This indication is for example done by assigning a specific color to the icon 57 related to each of the applications whereof an input datum has been judged inconsistent with the value of the corresponding generic datum. For example, when no inconsistency has been detected, the icon 57 is a first color, for example green, whereas when an inconsistency is detected, the icon 57 assumes a second color, for example red.

Advantageously, the icons 55 and 56 also have a different color depending on whether no inconsistency has been detected or an inconsistency has been detected. For example, the icons 55 and 56 also take on a red color when an inconsistency is detected.

This indication allows an operator to restart an application whereof at least one input datum has a value inconsistent with the value of the corresponding generic datum, this initialization allowing the data management application 32 to modify the value of the input datum by assigning it the current value of the generic datum.

Once the application is executed, based on the updated input data, the data management application 32 is able to update, in the associated mission or flight dossier, the values of the input data, in particular the modified input datum or data, and the values of the output data as determined by execution of the application based on the updated values of the input data.

Furthermore, when an output datum of a first application $30_1$ is an input datum of a second application $30_2$, the data management application 32 is able to verify the consistency between the value of this output datum and the value of this input datum, according to a predetermined consistency criterion that is for example of the type described above.

If the value of an output datum of the first application $30_1$ is judged inconsistent with the value of the corresponding input datum of the second application $30_2$, the data management application 32 is able to indicate this inconsistency to an operator, to allow an update of the value of the input datum, and of the output data or data determined based on this input datum by the second application.

This indication is for example done by assigning the icons 57 of the first $30_1$ and second $30_2$ applications an orange color. Advantageously, the icons 55 of the first $30_1$ and second $30_2$ applications, and the icon 56 of the second application $30_2$, also take on a specific color, for example orange.

This indication makes it possible to warn an operator of an inconsistency between the data of the two applications, and to inform him that this inconsistency can be resolved by restarting the second application $30_2$.

This indication also allows an operator to restart the second application $30_2$, for example by actuating the button 56, to assign the input datum the value of the corresponding output datum of the first application.

Once the second application is executed, based on updated input data, the data management application 32 is able to update, in the associated mission or flight dossier, the values of the input data, in particular of the modified input datum or data, and the values of the output data as determined by executing the application $30_2$ based on the values of the updated input data.

Thus, the data management application 32 is configured to keep the values of the input and output data of the applications 30 up to date when the value of a generic datum is modified.

The data management application 32 is thus also able to ensure the consistency of a generic mission or flight datum initialized by the output of an application. For example, in reference to FIG. 3, if the generic flight datum $GV_4$, initially blank, is entered by an output S3 of the application $30_3$, the consistency of the inputs and outputs of the applications $30_1$ and $30_2$ using this generic datum $GV_4$ is done using the associated predetermined criteria and the mechanisms for verifying consistency described above.

The data management application 32 is also able to indicate to the operator whether an output of an application initializes a generic flight or mission datum having a non-blank prior value. In this case, the data management application 32 makes it possible for the operator to manage the conflict using a free or predetermined criterion, for example by using the maximum value (minimum value, respectively) of the two values as generic datum. The other consistency verification mechanisms remaining active, the implications of this choice will be characterized for the operator. In the present case, an indicator potentially qualified as orange in the example above makes it possible to display an inconsistency between the associated output and the corresponding generic input datum.

The set of consistency processing mechanisms described above can be done manually or automatically.

The data management application 32 is thus able to generate, keep up to date and back up, in the memory 26 for a given mission, a set of information comprising:
 a set of generic mission data,
 for each flight, a set of generic flight data,
 for each flight, or for the entire mission, a set of generic aircraft data,
 a mission dossier, including a flight dossier for each flight of the mission, each flight dossier comprising, aside from data stored freely by the operator, for each application 30 having been executed, a set of corresponding input data and output data.

The data management application 32 of the portable terminal 10, respectively of each onboard terminal 12, is able to send the set of information set out above, via the data link 13, to each onboard terminal 12, respectively to the portable terminal 10, as well as to other computer devices, in particular to a central computer of an aircraft.

In particular, the data management application 32 of the portable terminal 10 is able to send all of this information, via the telecommunications means 17, to the data management application 32 of each onboard terminal 12.

Thus, the portable terminal 10 can be used to prepare an entire mission, independently of the aircraft designed to perform the flights of that mission. When a single aircraft is intended to perform the entire mission, the portable terminal 10 can then send the onboard terminal 12 of that aircraft, before the performance of the mission, the information set out above. Furthermore, if the flights of the mission are intended to be carried out by several aircraft, the portable terminal 10 can send the information cited above to the onboard terminal 12 of each of these aircraft, before the performance of a flight of the mission by that aircraft.

Furthermore, the data management application 32 of each onboard terminal 12 is able to send all of the information cited above, via the telecommunications means 17, to the central computer of the aircraft in which the terminal 12 is onboard, for the performance of one or more flights of the mission by that aircraft.

This information is for example intended to be sent to different systems of the aircraft, in particular navigation systems (for example, FMS), maintenance and operation systems, or systems related to the passenger universe, for example systems such as IFE (In Flight Entertainment) or cabin management.

Furthermore, the data management application 32 of each terminal 10 or 12 is able to receive, for example upon initialization, during a flight or at the end of a mission or flight performed by an aircraft, from the central computer of the aircraft, data developed by different systems of the aircraft, in particular control systems, maintenance and operation systems, or systems related to the passenger universe. The data management application 32 is further able to update the information contained in the mission and flight dossiers based on data received from the central computer of the aircraft, as described above.

The data management application 32 of each terminal 10 or 12 is further able, according to the same principles as described above, to detect, then process inconsistencies between the data managed on the terminals (in particular generic data, application outputs, etc.) and the corresponding (or equivalent) data received from the systems of the aircraft itself. As an example, the application 32 can detect that the mission prepared on the terminal 10 for an airplane with serial number x has been sent to the terminal 12 declaring itself to be the airplane with serial number y, or serial number x but with different configuration options.

The applications 30, in particular those intended to retrieve the flight or mission, can be executed by an operator based on generic data with up-to-date values.

Figure 5:
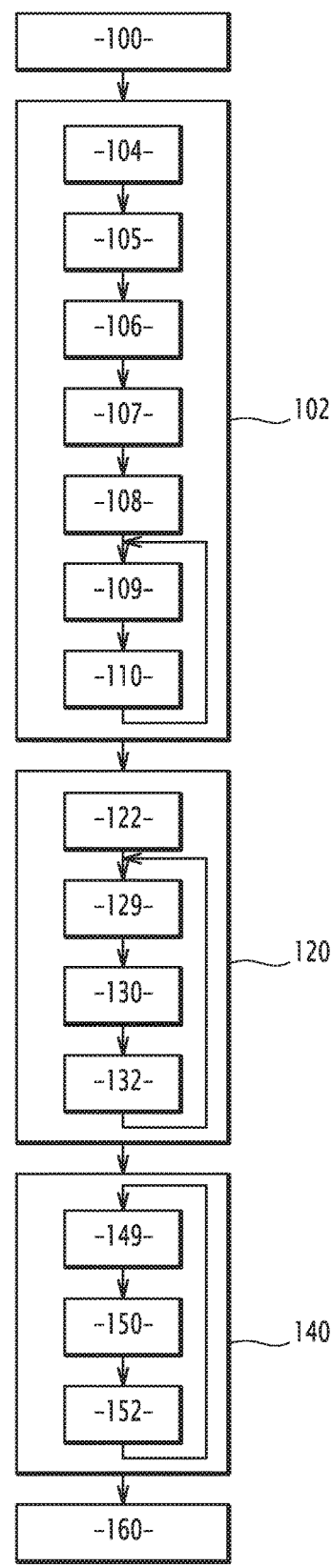
FIG. 5 is a flowchart of a method according to an embodiment of the invention.

In reference to FIG. 5, the implementation of the data management method according to one embodiment of the invention for the preparation, performance and retrieval of a mission will now be described.

As an example, it will be considered that the mission is intended to be carried out by a single aircraft, the system 1 thus comprising a portable terminal 10 and a separate terminal 12 onboard the aircraft, and three generic data groups will be considered: generic mission data, generic flight data and generic aircraft data.

The method comprises an initialization phase 100, implemented at the same time on the portable terminal 10 and the onboard terminal 12, for example during an installation or update of the applications 30 on the terminals 10 and 12. This update can be done in connection with a data link with a remote site managing the configurations applicable to each aircraft and each crew. This update can be done locally using mass memory devices.

During the initialization phase 100, the data management application 32 determines (in particular dynamically, by configuration file, etc.), among the input data of the applications 30, the generic input data shared by at least two of these applications. The data management application 32 next generates (in particular dynamically, by configuration file, etc.), from these generic data, a generic mission data set 34, a generic aircraft data set 36, and, for each flight of the mission, a generic flight data set 38.

Each generic flight data set 38 comprises data relative to that flight, such as the date of the flight, the departure and arrival airport codes, the names of the crew members, the number of passengers, the serial number of the aircraft intended to perform the flight, etc.

The generic aircraft data set 36 comprises characteristics of the aircraft intended to perform the mission.

The generic mission data set 34 comprises data relative to the entire mission, in particular the airport codes through which the aircraft pass during the performance of the mission and the dates of each of the flights of the mission. The generic mission data set 34 further comprises the generic flight and aircraft data valid for the entire mission. In the case at hand, it in particular relates to the serial number of the aircraft intended to carry out the entire mission.

The method next comprises a mission preparation phase 102, during which an operator generates the execution of applications 30 in order to determine information necessary to carry out the mission.

This phase 102 is for example implemented using the portable terminal 10, outside the aircraft.

The phase 102 comprises a step 104 for assigning values to the generic data, for example from values entered by an operator via the entry means 20.

In particular, during step 104, the data management application 32 receives generic mission data values, and assigns the received value to each of these generic mission data.

Furthermore, the data management application 32 assigns, to each generic flight or aircraft datum corresponding to a generic mission datum, the value of the corresponding generic mission datum. In the present case, since the serial number of the aircraft is a generic mission datum and a generic flight datum for each of the flights, the data management application 32 assigns the number of the "serial number" generic mission datum to the "serial number" generic flight datum of each of the generic flight data sets.

The data management application 32 also receives, for each of the flights, the values of the generic flight and/or aircraft data not yet entered, and assigns each of these generic flight and/or aircraft data the received value. These values are for example entered by an operator using the entry means 20.

The phase 102 next comprises a step 105 for configuring the applications 30. Advantageously, this step is carried out during the initialization of each application 30.

Thus, during step 105, for each application 30 to be executed, the operator actuates an icon associated with that application 30 displayed on the screen 21, thus generating the initialization of that application 30. Furthermore, the operator chooses the mission or flight for which he wishes to execute the application 30.

During the initialization of an application 30, the data management application 32 assigns, to each of the input data of the application 30 corresponding to a generic datum, i.e., a generic mission, flight, or aircraft datum, the value of that generic mission datum as assigned during step 104.

The values of the other input data of the application 30, i.e., the input data specific to the application 30 that do not correspond to generic data, are entered manually by the operator.

In particular, if the application 30 is initialized in relation with the entire mission, the data management application 32 assigns, to each of the input data of the application 30 corresponding to a generic mission datum of the set 34, the value of this generic mission datum.

If the application 30 is initialized in relation with a specific flight of the mission, the data management application 32 assigns, to each of the input data of the application 30 corresponding to a generic flight or aircraft datum, the value of this generic flight or aircraft datum in the generic aircraft 36 or flight 38 data set associated with that specific flight.

Then, during a step 106, the operator launches the execution of the application 30 by actuating a dedicated button displayed on the screen 21, this execution generating the determination of the output data of the application 30.

During a step 107, the data management application 32 automatically assigns, to each generic datum that would correspond to one of the output data determined during step 106, the value of that output data. If the generic data had a non-blank value before this assignment, i.e., had a value filled in beforehand, the data management application 32 implements a conflict resolution mechanism, as described above, according to a free or predetermined criterion, for example by selecting the maximum (minimum, respectively) value of the two values as generic datum.

The phase 102 further comprises a step 108 for generating, by the data management application 32, a mission dossier for the entire mission, and for each of the flights of the mission, a flight dossier.

As indicated above, aside from the data stored freely by the operator, each flight dossier comprises, for each application 30 having been executed in relation with that flight, the values of the input data based on which the application 30 was executed, and the corresponding output data, i.e., as determined by execution of the application 30 based on these values of the input data. Each flight dossier thus comprises, for each application 30 having been executed, a pair of input data and corresponding output data.

Furthermore, the mission dossier comprises all of the flight dossiers relative to the flights of the mission, and, for each application 30 having been executed in relation with the mission, the values of the input data based on which the application 30 has been executed, and the corresponding output data, i.e., as determined by executing the application 30 based on these input data values.

The data management application 32 saves the mission dossier and the flight dossiers in the memory 26.

Once the mission dossier and the flight dossiers are generated and saved, the input data and/or the generic data can be modified by an operator, during one or several steps 109.

In order to account for such modifications, the data management application 32, after detecting this modification, implements, for each mission dossier and flight dossier, a step 110 for verifying the consistency of the values of the input data.

Thus, during the verification step 110, the data management application 32 verifies the consistency between the values of the generic data and the values of the input data. The data management application 32 also verifies the consistency between the values of the input data from applications corresponding to output data from other applications, with the values of these output data.

During this step 110, the data management application 32 judges the value of an input datum to be consistent with the value of the generic datum or the corresponding output datum if the value of the input datum and the value of the generic or output datum meet a predetermined criterion, as described above.

For example, the value of input datum is judged to be consistent with the value of the corresponding generic or output datum if a deviation between the value of the input datum and the value of the generic or output datum is null or below a predetermined threshold, or on the contrary inconsistent with the value of the corresponding generic or output datum if the value of the generic or output datum and the value of the input datum do not meet the predetermined criterion.

If the value of at least one input datum is judged to be inconsistent with the value of the corresponding generic output datum, the data management application 32 indicates this inconsistency to an operator.

This indication is for example done by assigning a specific color, for example red, to the icons 55, 56 and 57 connected related to each of the applications whereof an input datum has been judged inconsistent with the value of the corresponding generic datum.

The verification step 110 then comprises an update of the value of each input datum whose value has been judged inconsistent, each input datum being updated by assigning it the value of the corresponding generic datum. To that end, each application whereof an input datum has been judged inconsistent with the value of the corresponding generic datum is initialized, for example by an operator, by actuating the second icon 56 related to the application. This actuation causes the initialization of the application, during which the data management application 32 modifies the value of the input datum judged inconsistent by assigning it the current value of the generic datum.

The application is then executed, based on updated input data, and the data management application 32 updates, in the associated mission or flight dossier, the values of the input data, in particular the modified input datum or data, and the values of the output data as determined by execution of the application based on the values of the updated input data.

If an output datum of a first application $30_1$ executed during this update is an input datum of another application $30_2$, the data management application 32 once again verifies the consistency between the value of this output datum and the value of this input datum.

If the value of an output datum of the first application $30_1$ is judged inconsistent with the value of the corresponding input datum of the second application $30_2$, the data management application 32 indicates this inconsistency to an operator.

This indication is for example done by assigning the icons 55 and 57 associated with the outputs of the first $30_1$ and second $30_2$ applications, as well as the icon 56 of the second application $30_2$, an orange color.

Then, during a new update, the operator initializes the application $30_2$ by actuating the icon 56 connected to the application. This actuation causes the initialization of the application $30_2$, during which the data management application 32 modifies the value of the input datum judged inconsistent by assigning it the corresponding value of the output datum of the application $30_1$.

The application $30_2$ is then executed, based on updated input data, and the data management application 32 updates, in that associated mission or flight dossier, the values of the input data, in particular the modified input datum or data, and the values of the output data as determined by execution of the application based on values of the updated input data.

If the value of an output datum of the first application $30_1$ is judged inconsistent with the value of the corresponding generic input datum (which may happen if generic data can be entered by an output of an application), the data management application 32 indicates this inconsistency to an operator.

This indication is for example done by assigning the icon 55 associated with the outputs of the application $30_1$ an orange color.

The method next comprises, before carrying out the mission, a phase 120 for loading information relative to the mission as generated during the phase 102 from the portable terminal 10 toward the central computer of the aircraft via the onboard terminal 12.

This information in particular comprises:
the set of generic mission data,
for each flight, a generic flight data set,
all of the generic aircraft data,
the mission dossier, including, for each flight of the mission, a flight dossier.

The phase 120 comprises a step 122, during which the data management application 32 of the portable terminal 10 sends the set of information cited above, via the data link 13, to the data management application 32 of the onboard terminal 12. The data management application 32 of the terminal 12, according to the same principles as those described above, if applicable detects, then allows the operator to process any inconsistencies between the generic data of the terminal and the corresponding (equivalent) data received from the systems of the aircraft itself.

Then, the data management application 32 of the onboard terminal 12 sends the set of information cited above, via the telecommunications means 17, to the central computer of the aircraft, for the performance of one or more flights of the mission by that aircraft.

Once the mission dossier and the flight dossiers are saved in the onboard terminal 12 and the central computer of the aircraft, the input data and/or the generic data can be modified by an operator, during one or more steps 129, similar to the step 109, using the onboard terminal 12.

In order to account for such modifications, the data management application 32 implements, for each mission dossier and flight dossier, after each step 129, a verification step 130 similar to the step 110 carried out during the mission preparation phase 102.

The data management application 32 next carries out a step 132 to update the information sent to the central computer of the aircraft.

The method next comprises a phase 140 for the performance of the mission by the aircraft. During the performance of the mission, certain generic input and/or output data can be modified by an operator, during one or more steps 149, similar to the steps 109 and 129, using the onboard terminal 12.

In order to account for such modifications, the data management application 32 implements, for each mission dossier and flight dossier, after each step 139, a verification step 150 similar to the steps 110 and 130 and an updating step 152 for updating the information sent to the central computer of the aircraft similar to the step 132.

At the end of the performance of the mission, the method comprises a phase 160 for unloading data, in which the data management application 32 of the onboard terminal 12 receives, from the central computer of the aircraft, data developed by different systems of the aircraft, in particular control systems, maintenance and operation systems, or systems related to the passenger universe. The data management application 32 then updates the information contained in the mission and flight dossiers based on the data thus received from the central computer of the aircraft and makes it possible to unload these dossiers and other associated data in the mobile 10 or remote terminals through the data link 13.

The applications 30, in particular those intended to retrieve the flight or mission, are then executed by an operator, in particular for the retrieval of the mission.

The method according to embodiments of the invention thus makes it possible to facilitate the preparation, performance and retrieval of a mission by an operator and to ensure continuity in the processing of data all throughout a mission. In particular, the method according to embodiments of the invention make it possible to facilitate the entry of the input data of different applications implemented during the preparation, performance and retrieval of the mission, and to ensure that the input and output data of these applications are consistent with respect to one another, such that a modification of a datum is indeed taken into account by all of the applications.

It must be understood that the example embodiments described above are not limiting.

In particular, the system 1 may comprise a single module. In this case, the terminals 10 and 12 are combined to form a single terminal, in particular retractable and separated from an aircraft, able to exchange information directly with the central computer of an aircraft.

What is claimed is:

1. A management method for managing data relative to a mission comprising at least one flight by an aircraft, the data comprising input data of at least two mission information applications and output data of the mission information applications, each mission information application being executable by a data management terminal including a processor and a memory to receive the input data and to determine, from a value of the input data of the mission information application, a value of the output data of the mission information application, the output data being usable by an onboard computer of the aircraft for performance of the mission, two of the mission information applications having at least one input datum in common, the common input datum having for each of the two mission information applications a respective value, the method comprising:

providing at least one set of generic data relative to the mission of the aircraft onto the memory of the data management terminal, the at least one set of generic data relative to the mission of the aircraft including generic mission data, generic flight data and/or generic aircraft data, the data management terminal being configured for managing data relative to the mission of the aircraft, the data management terminal comprising a data management application stored in the memory, the processor configured to execute the data management application, each of the generic data relative to the mission of the aircraft relative to the mission of the aircraft corresponding to a common input datum of the two mission information applications;

assigning, via the data management application, a value to at least one of the generic data for at least one flight of the mission and saving the value of the generic data in the memory; and configuring the mission information applications by automatically assigning the value of each generic datum to the respective values of each common input datum corresponding to the generic datum, such that each common input datum has the same value for each application, and such that the values of the common input data of the mission information applications are automatically entered during an initialization of each of the mission information applications.

2. The method as recited in claim 1 further comprising, after the configuration, executing at least one of the mission information applications, based on values of the input data assigned during the configuration step, to determine the value of the output datum or data of the mission information application.

3. The method as recited in claim 2 further comprising at least one consistency verification, comprising:

verifying the consistency of the value of at least one generic datum with the value of at least one corresponding input datum, and/or verifying the consistency of the value of at least one generic datum with the value of at least one corresponding output datum, and/or verifying the consistency of the value of at least one output datum of a first of the mission information applications with the value of the corresponding input datum of one or more other mission information applications, the value of a first datum being deemed consistent with the value of a second datum if the value of the first datum and the value of the second datum meet a predetermined criterion.

4. The method as recited in claim 3 wherein the value of a first datum is deemed consistent with the value of a second datum if the absolute value of a deviation between the value of the first datum and the value of the second datum is null or below a predetermined threshold.

5. The method as recited in claim 4 wherein the verification comprises, when the value of at least one input datum is deemed inconsistent with the value of the corresponding generic datum or with a corresponding output datum of another of the mission information applications, an update of the value of the input datum, in which the value of the generic datum or the output datum is assigned to the input datum.

6. The method as recited in claim 2 further comprising generating, for at least one flight of the mission, a flight dossier comprising, for each mission information application having been executed, the values of the input data and the value of each output datum of the mission information application, as determined by executing the mission information application based on the values of the input data of the mission information application.

7. The method as recited in claim 6 further comprising generating, for the whole mission, a mission dossier comprising the or each of the flight dossier(s).

8. A method for managing a mission comprising at least one flight of an aircraft, the method comprising:

implementing the method as recited in claim 7 on the data management terminal outside the aircraft, before performing a given flight of the mission;

loading the mission dossier and the flight dossier relative to the given flight from the data management terminal in an onboard memory in the aircraft, before the performance of the given flight by the aircraft; and unloading the mission dossier and the flight dossier relative to the given flight from an onboard memory in the aircraft intended for at least one module outside the aircraft, after the performance of the given flight by the aircraft.

9. The method as recited in claim 8 wherein:

the loading comprises the transfer of the mission dossier and the flight dossier from the outside data management terminal into a module onboard the aircraft, before the performance of the given flight by the aircraft, and comprises a verification of the consistency of the value of at least one input or output datum from the outside data management terminal with the value of at least one corresponding input or output datum in the onboard module, from the aircraft, and the unloading comprises a transfer of the mission dossier and the flight dossier relative to the given flight from the onboard module to the outside data management terminal, after the performance of the given flight by the aircraft.

10. The method as recited in claim 1 further comprising, after the execution, assigning the value of at least one output datum determined during the execution step to one or more generic data corresponding to the output datum.

11. The method as recited in claim 1 wherein the mission information applications are:

applications configured to determine centering and flight envelope of an aircraft designed to perform at the at least one flight of the mission, and/or applications configured to estimate information relative to a high-speed and low-speed performance of the aircraft, and/or applications configured to provide and display, for an operator, documentation relative to an aircraft designed to perform the at least one flight of the mission, and/or applications configured to provide and display, for an operator participating in the mission, geographical information, flight plans, weather information, logistical information, maintenance information or information relative to comfort or entertainment of passengers.

12. The method as recited in claim 1 wherein:
the generic flight data comprises a date of the flight, departure and arrival airport codes, names of crew members of the aircraft, a number of passengers and/or a serial number of the aircraft;
the generic aircraft data comprises a mass of the aircraft when empty, a floor plan of the aircraft and options present; and
the generic mission data comprises codes of each of the airports through which the aircraft will pass during the performance of the mission and dates of each of the flights of the mission.

13. A data management terminal including a processor and a memory, the data management terminal being configured for managing data relative to a mission comprising at least one flight by an aircraft, the data comprising input data of at least two mission information applications and output data of the mission information applications, each mission information application being able to be executed by a computer to determine, from a value of the input data of the mission information application, the output data of the mission information application, a value of the output data being usable by an onboard computer of the aircraft for performance of the mission, two of the mission information applications having at least one input datum in common, the common input datum having for each the two mission information applications a respective value, the data management terminal comprising a data management application stored in the memory, the processor configured to execute the data management application to:
generate at least one generic data set relative to at least one flight of the mission, the at least one set of generic data relative to the mission of the aircraft including generic mission data, generic flight data and/or generic aircraft data, each of the generic data relative to the mission of the aircraft corresponding to a common input datum of the two mission information applications;
assign, to at least one generic datum, a value of the generic datum for at least one flight of the mission and save the value of the generic data in the memory; and
configure the mission information applications by automatically assigning the value of each generic datum to the respective values of each common input datum corresponding to the generic datum, such that each common input datum has the same value for each application, and such that the values of the input data of the mission information applications are automatically entered during an initialization of each of the mission information applications.

14. The data management terminal as recited in claim 13 wherein the data management application for managing data is configured to verify a consistency of the values of the generic data with the values of the corresponding input data, the value of a generic datum being deemed consistent with the value of a corresponding input datum if the value of the input datum and the value of the generic datum meet a predetermined criterion.

15. The data management terminal as recited in claim 14 wherein the data management application is configured to update the value of an input datum deemed inconsistent with the value of the corresponding generic datum, by assigning the value of the generic datum to the input datum.

16. The data management terminal as recited in claim 13 wherein the data management application is configured to generate, for each flight of the mission, a flight dossier relative to the flight, the flight dossier comprising, for each mission information application having been executed, the values of the input data and the value of each output datum of the mission information application, as determined by executing the mission information application based on the values of the input data of the mission information application.

17. A management system for managing a mission comprising at least one flight by an aircraft, comprising:
a first data management module configured as the data management terminal recited in claim 13, the first data management module being movable independently of any aircraft intended to perform a flight of the mission; and
at least one second data management module configured as the data management terminal recited in claim 13, the at least one second data management module being onboard an aircraft designed to perform a flight of the mission.

18. A management method for managing data relative to a mission comprising at least one flight by an aircraft, the data comprising input data of at least two mission information applications and output data of the mission information applications, each mission information application being executable by a data management terminal including a processor and a memory to receive the input data and to determine, from a value of the input data of the mission information application, a value of the output data of the mission information application, the output data being usable by an onboard computer of the aircraft for performance of the mission, two of the mission information applications having at least one input datum in common, said common input datum having for each of said two mission information applications a respective value, the method comprising:
providing at least one set of generic data relative to the mission of the aircraft onto the memory of the data management terminal, the at least one set of generic data relative to the mission of the aircraft including generic mission data, generic flight data and/or generic aircraft data, the data management terminal being configured for managing data relative to the mission of the aircraft, the data management terminal comprising a data management application stored in the memory, the processor configured to execute the data management application, each of the generic data relative to the mission of the aircraft relative to the mission of the aircraft corresponding to a common input datum of said two mission information applications; this step of providing comprising:
determining, among the input data of the mission information applications, the input data common to at least two of these mission information applications, and generating, from these common input data, said generic data set;

assigning, via the data management application, a value to at least one of the generic data for at least one flight of the mission and saving the value of the generic data in the memory; and configuring the mission information applications by automatically assigning the value of each generic datum to the respective values of each common input datum corresponding to said generic datum, such that each common input datum has the same value for each application, and such that the values of the common input data of the mission information applications are automatically entered during an initialization of each of the mission information applications.

* * * * *